United States Patent
Harada et al.

(10) Patent No.: US 9,275,347 B1
(45) Date of Patent: Mar. 1, 2016

(54) ONLINE CONTENT CLASSIFIER WHICH UPDATES A CLASSIFICATION SCORE BASED ON A COUNT OF LABELED DATA CLASSIFIED BY MACHINE DEEP LEARNING

(71) Applicant: AlpacaDB, Inc., San Mateo, CA (US)

(72) Inventors: Hitoshi Harada, Foster City, CA (US); Yuki Hayashi, Kobe (JP)

(73) Assignee: AlpacaDB, Inc., San Mateo, CA (US)

( * ) Notice: Subject to any disclaimer, the term of this patent is extended or adjusted under 35 U.S.C. 154(b) by 0 days.

(21) Appl. No.: 14/879,787

(22) Filed: Oct. 9, 2015

(51) Int. Cl.
| | |
|---|---|
| *G06F 15/18* | (2006.01) |
| *G06N 99/00* | (2010.01) |
| *G06F 17/30* | (2006.01) |
| *G10L 15/08* | (2006.01) |

(52) U.S. Cl.
CPC .......... *G06N 99/005* (2013.01); *G06F 17/3089* (2013.01); *G06F 17/30598* (2013.01); *G10L 15/08* (2013.01)

(58) Field of Classification Search
CPC .......................... G06F 17/30598; G10L 15/08
USPC ................................................ 706/12, 20, 45
See application file for complete search history.

(56) References Cited

U.S. PATENT DOCUMENTS

| | | | | |
|---|---|---|---|---|
| 2014/0223462 | A1* | 8/2014 | Aimone ............ | H04N 21/42201 725/10 |
| 2015/0254555 | A1* | 9/2015 | Williams, Jr. ........ | G06N 3/0454 706/14 |
| 2015/0363294 | A1* | 12/2015 | Carback, III .............. | G06F 8/37 717/132 |

OTHER PUBLICATIONS

Cohen et al., Semisupervised Learning of Classifiers: Theory, Algorithms, and Their Application to Human-Computer Interaction, 2004, IEEE, pp. 1553-1567.*
Crammer, K. et al., "Adaptive Regularization of Weight Vectors," Advances in Neural Information Processing Systems 22, proceedings from the conference Neural Information Processing Systems 2009 (NIPS 2009), http://papers.nips.cc/paper/3848-adaptive-regularization-of-weight-vectors.pdf (9 pages).
Convolutional Neural Network, Wikipedia, https://en.wikipedia.org/wiki/Convolutional_neural_network, Aug. 2013, Accessed Jun. 22, 2015 (8 pages).
NORB: Generic Object Recognition in Images, http://www.cs.nyu.edu/~yann/research/norb/, New York University, Sep. 2003, Accessed Jun. 22, 2015 (10 pages).
Donahue, J. et al., "DeCAF: A Deep Convolutional Activation Feature for Generic Visual Recognition," eprint arXiv:1310.1531, http://arxiv.org/pdf/1310.1531.pdf, Oct. 6, 2013 (10 pages).
Bag-of-words model in computer vision, Wikipedia, https://en.wikipedia.org/wiki/Bag-of-words_model_in_computer_vision, Dec. 2007, Accessed Jun. 22, 2015 (5 pages).

* cited by examiner

*Primary Examiner* — David Vincent
(74) *Attorney, Agent, or Firm* — John W. Branch; Lowe Graham Jones PLLC (57) ABSTRACT

Embodiments are directed towards online content classification that includes training a machine learning system. A batch of data items may be randomly selected from unlabeled test data. The batch of data items may be communicated to a client computer enabling a user to label each data item based on the contents of each data item. These labeled data items may be employed to train the machine learning system. While a classification result score is less than a threshold value, iteration may be performed to train the machine learning system. For each iteration another batch of data items may be selected from the unlabeled test data. This batch of data items may be classified using the machine learning system. The batch of classified data items may be communicated back to the client computer to be labeled by the user.

30 Claims, 7 Drawing Sheets

ONLINE CONTENT CLASSIFIER WHICH UPDATES A CLASSIFICATION SCORE BASED ON A COUNT OF LABELED DATA CLASSIFIED BY MACHINE DEEP LEARNING

TECHNICAL FIELD

The present invention relates generally to classification of content using machine learning, and more particularly, but not exclusively to reducing the amount of test data that must be labeled by a user.

BACKGROUND

Increasingly, machine learning is being employed for automatically classifying data. Often data may be classified by associating it with one or more labels that correspond to various features of the data. For example, an image classifiers may be arranged to classify images of animals based on the type of animal shown in a given image. In this example, labels may be defined for the type of animal (e.g., sheep, tiger, whale, and so on). Also, in some cases, labels may be defined for various properties of data. Going back to the animal example, labels may be defined such as, mammal, reptile, bird, carnivore, or the like. In many cases, machine learning systems used for classifying data need to be trained using sample data that is correctly labeled. If the classifier is trained using sufficiently and correctly labeled sample data, it may be enabled to correctly classify provided data based on its training. In some cases, many correctly labeled sample data examples must be provided to properly train the classifier. Labeling the sample data may require an expert or other user to manually assign labels to each sample data. In some cases, it may be very time consuming and/or labor intensive to generate the large number of label sample data examples that may be required to train a classifier. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein.

DESCRIPTION OF THE VARIOUS EMBODIMENTS

The present innovations now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the various embodiments to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

As used herein, the term "machine learning system" refers to computer systems that may be used for classifying input data, pattern recognition, making predictions based on input data, identifies features and/or relationships in data, or the like. While there are many different types of machine learning systems, a common feature is that machine learning systems require training to learn to perform their task. The details of the training process may vary depending on the type of machine learning system, but often it entails providing known/understood test data to the machine learning system and evaluating its success and/or failures at performing the desired tasks (e.g., classifying and/or categorizing the data). These evaluation results are then provided to the machine learning system which will adapt its internal systems based on the evaluations. This process may continue until the machine learning system has "learned" to produce satisfactory results. Various well-known machine learning systems may include, artificial neural networks, deep learning neural networks, convolutional neural networks, adaptive regularization of weights, or the like, or combination thereof.

As used herein the term "machine deep learning system" refers to a machine learning system that comprises one or more deep learning architectures, such as, deep neural networks, convolutional deep neural networks, or the like.

Briefly stated, embodiments are directed towards online content classification that includes training a machine learning system. In at least one of the various embodiments, the machine learning system may include a feature extractor, an online classifier, or the like. In at least one of the various embodiments, a batch of data items may be randomly selected from unlabeled test data. In at least one of the various embodiments, the data items may be different types, such as, images, documents, text documents, audio, financial data, or human speech, or the like. In at least one of the various embodiments, the configuration and/or one or more of the components of the machine learning system may be optimized for a particular type of data.

In at least one of the various embodiments, the batch of data items may be communicated to a client computer enabling a user of the client computer to label each data item based on the contents of each data item. In at least one of the various embodiments, the labeled data items may be employed to train the machine learning system.

In at least one of the various embodiments, while a classification result score is less than a threshold value, additional steps may be iteratively performed to training the machine learning system. Also, in at least one of the various embodiments, the value of the threshold for the classification result score may be defined based on the particular application that the machine learning system is being used for, and/or the type of the test data that is being used. In at least one of the various embodiments, for each iteration another batch of data items may be randomly selected from the remainder of the unlabeled test data. This batch of data items may be classified using the machine learning system that may be partially trained during each iteration of labeled data items.

In at least one of the various embodiments, the batch of classified data items may be communicated back to the client computer. In at least one of the various embodiments, this may enable the user to label each classified data item based on whether the content of each classified data item has been classified correctly by the machine learning system. In at least one of the various embodiments, scoring each classified data item may include grouping the correctly classified data items into one group and grouping incorrectly classified data items into another group. In at least one of the various embodiments, each classified data item may be labeled automatically using another machine vision system.

In at least one of the various embodiments, the labeled data items may be communicated back to the machine learning system where the labeled data items may be used to further train the machine learning system. In at least one of the various embodiments, the classification result score may be updated based on how the user labeled data items. For example, the classification result score may be increased as the number of classification mistakes that were corrected is reduced.

In at least one of the various embodiments, if the training sessions are complete (e.g., the classification result score is high enough) the machine learning system may be used to classify live data.

In at least one of the various embodiments, user interfaces used for labeling the test data item may include at least two workspaces. In at least one of the various embodiments, one workspace may be arranged to display the data items that were classified correctly and the other workspace may be arranged to display the data items that may be classified classified incorrectly.

Illustrated Operating Environment

Figure 1:
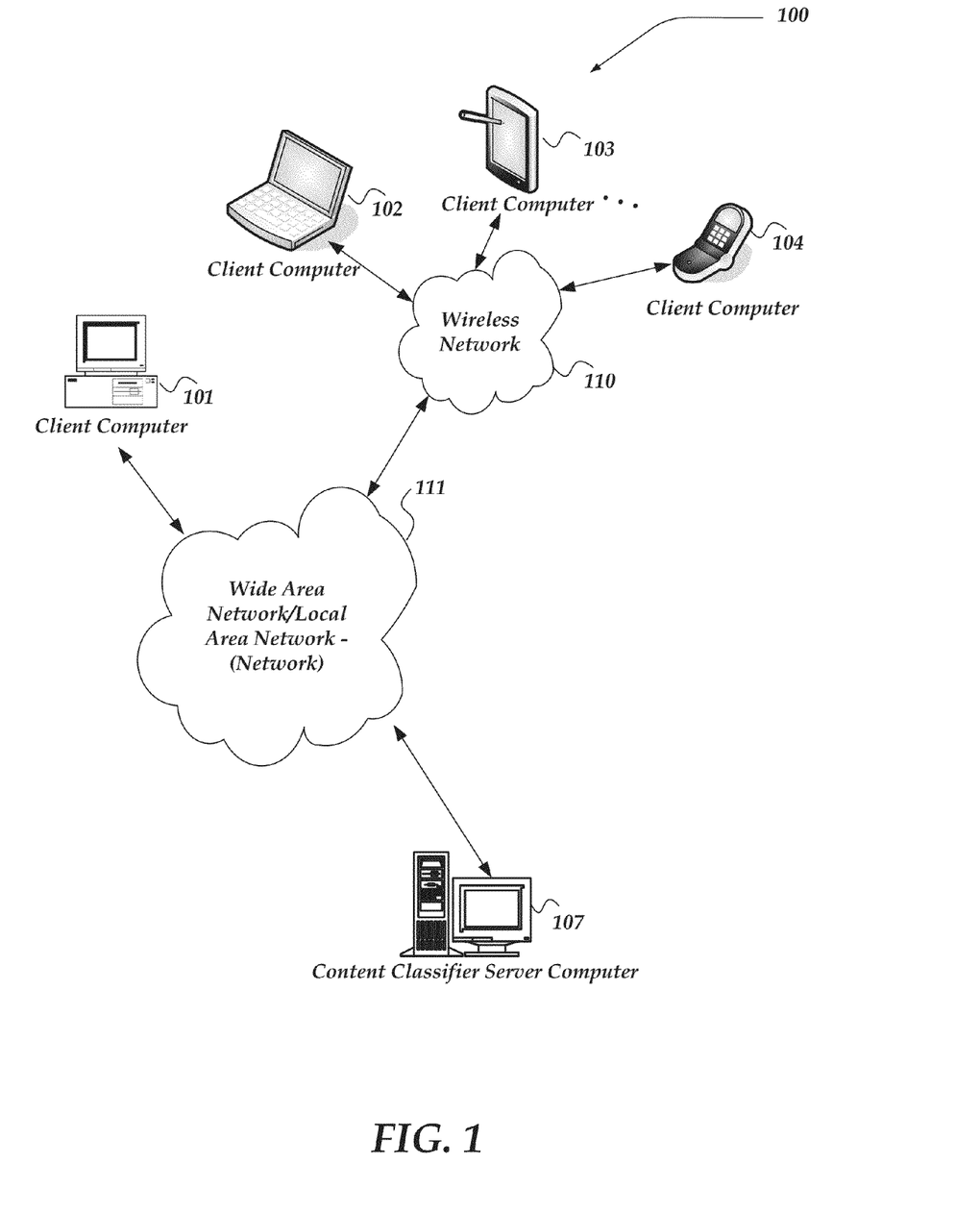
FIG. 1 illustrates a system diagram showing components of an environment in which at least one of the various embodiments may be practiced.

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")–(network) 111, wireless network 110, client computer 101-104, and Content Classifier Server Computer 107.

Generally, client computers 102-104 may include virtually any portable computing device capable of receiving and sending a message over a network, such as network 111, wireless network 110, or the like. Client computers 102-104 may also be described generally as client computers that are configured to be portable. Thus, client computers 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDA's), handheld computers, laptop computers, wearable computers, tablet computers, integrated devices combining one or more of the preceding devices, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile device may have a touch sensitive screen, a stylus, and several lines of color LCD in which both text and graphics may be displayed.

Client computer 101 may include virtually any computing device capable of communicating over a network to send and receive information, including messaging, performing various online actions, or the like. The set of such devices may include devices that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these devices include a capability to access and/or otherwise communicate over a network such as network 111 and/or wireless network 110. Moreover, client computers 102-104 may access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including classifying content.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile devices, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computing device, network, or the like.

Network 111 is configured to couple network computers with other computing devices, including, CMP 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 3:
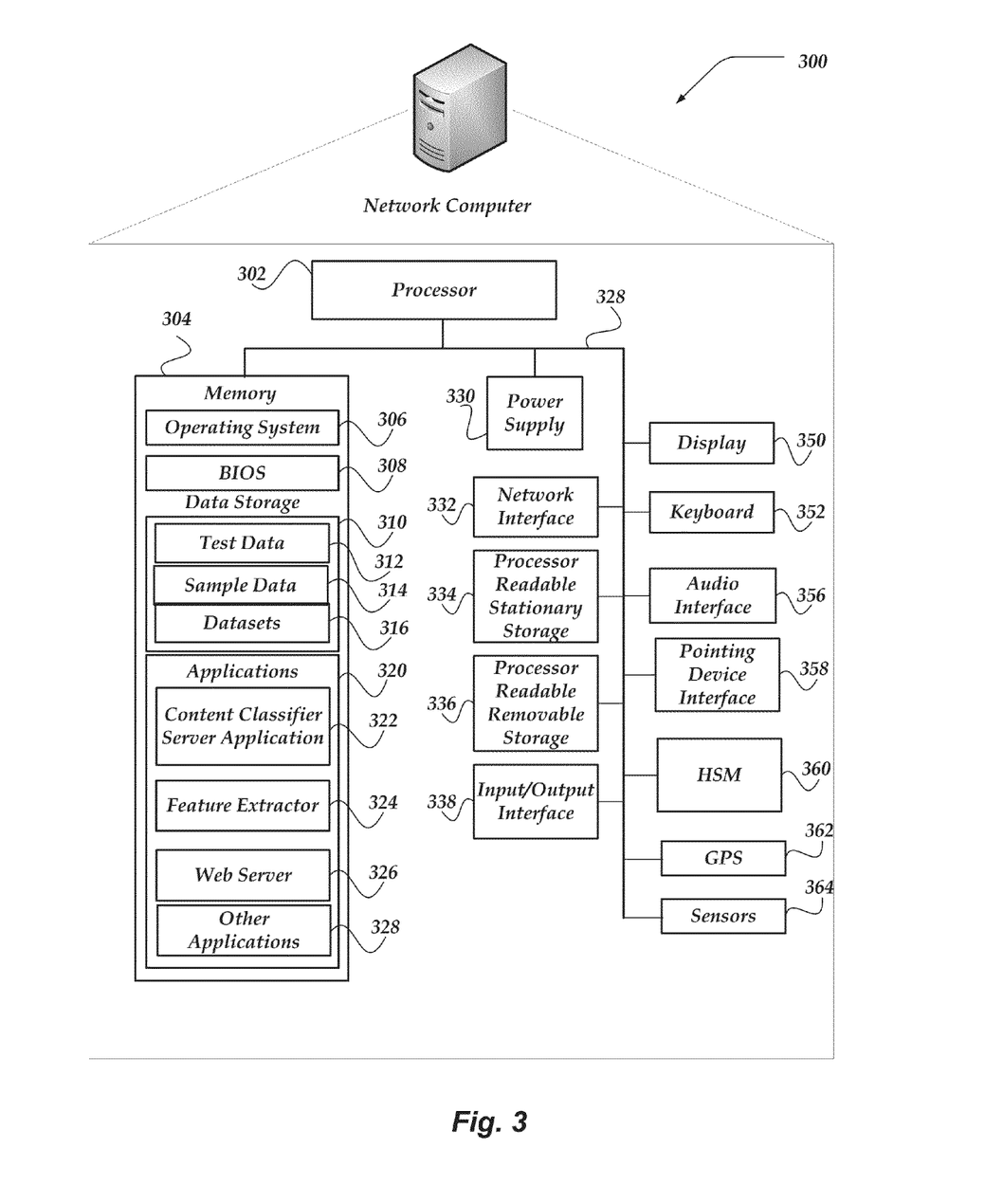
FIG. 3 illustrates one embodiment of a network computer that may be included in a system.

Content classifier server computer 107 may include virtually any network computer usable to perform data processing operation that may be used for online content classifications, such as network computer 300 of FIG. 3. In at least one of the various embodiments, content classifier server computer 107 employs various techniques for online content classification in accordance with at least one of the various embodiments.

Devices that may operate as content classifier server computer 107 include various network computers, including, but not limited to personal computers, desktop computers, multiprocessor systems, microprocessor-based or programmable consumer electronics, network PCs, server devices, tablet computers, network appliances, or the like. It should be noted that while content classifier server computer 107 is illustrated as a single network computer, the invention is not so limited. Thus, in another embodiment, content classifier server computer 107 may represent a plurality of network computers. For example, in at least one of the various embodiments, content classifier server computer 107 may be distributed over a plurality of network computers and/or implemented using cloud architecture.

Moreover, content classifier server computer 107 is not limited to a particular configuration. Rather, content classifier server computer 107 may operate using a controller/worker approach over a plurality of network computers, within a cluster, a peer-to-peer architecture, cloud-based architecture (e.g., virtual machines), and/or any of a variety of other architectures. Thus, content classifier server computer 107 is not to be construed as being limited to a single environment, and other configurations, and architectures are also envisaged. content classifier server computer 107 may employ processes and such as described below in conjunction with FIG. 4 and above to perform at least some of its actions.

Illustrative Client Computer

Figure 2:
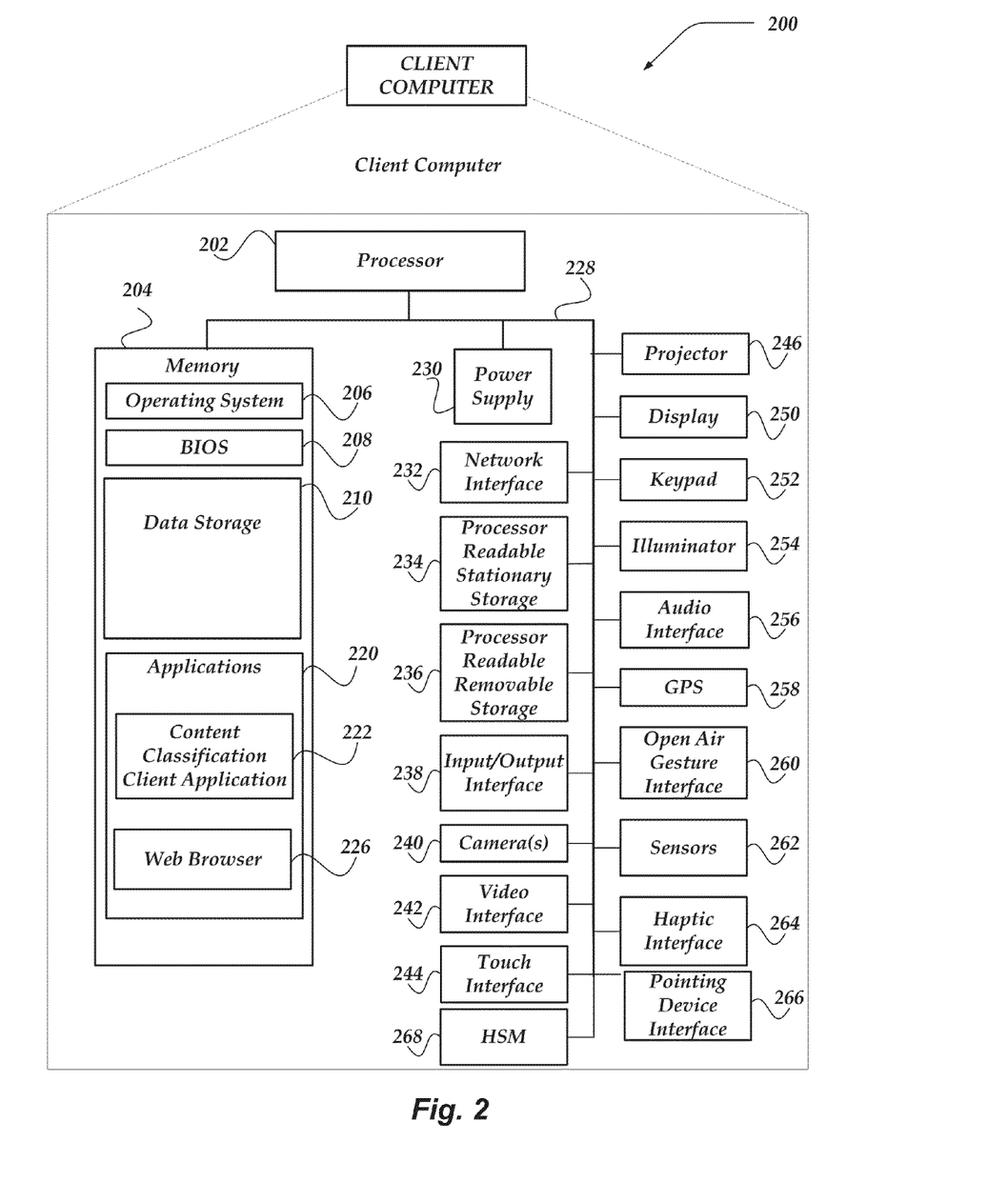
FIG. 2 shows one embodiment of a client computer that may be included in a system.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

In at least one of the various embodiments, client computer 200 may also include sensors 262 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 262 may be one or more hardware sensors that collect and/or measure data that is external to client computer 200

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, content classification client application 222. In at least one of the various embodiments, content classification client application 222 may be used to communicate and/or exchange information with content classifier server computer 107, including, but not limited to, queries, searches, API calls, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

In at least one of the various embodiments, applications, such as, content classification application 222, web browser 226, other applications, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 258. Also, in some embodiments, geolocation information may include information providing using one or more geolocation protocols over the networks, such as, wireless network 108 and/or network 111.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

FIG. 3 shows one embodiment of network computer 300 that may be included in a system implementing one or more embodiments of the described innovations. Network computer 300 may include many more or less components than those shown in FIG. 3. However, the components shown are sufficient to disclose an illustrative embodiment for practicing these innovations. Network computer 300 may represent, for example, one embodiment of content classifier server computer 107 of FIG. 1.

As shown in the figure, network computer 300 includes a processor 302 in communication with a memory 304 via a bus 328. Network computer 300 also includes a power supply 330, network interface 332, audio interface 356, global positioning systems (GPS) receiver 362, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300.

Network computer 300 may also include sensors 364 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 364 may be one or more hardware sensors that collect and/or measure data that is external to network computer 300

In at least one embodiment, however, network computer 300 may, through other components, provide other information that may be employed to determine a physical location of the client computer, including for example, a Media Access Control (MAC) address, IP address, and the like.

Human interface components may be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), non-transitory, and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, test data 312, sample data 314, one or more datasets 316, or the like.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include content classification server application 322, feature extractor 324, web server application 326, other applications 328, or the like, that may perform actions further described below. In at least one of the various embodiments, one or more of the applications may be implemented as modules and/or components of another application. Further, in at least one of the various embodiments, applications may be implemented as operating system extensions, modules, plugins, or the like.

In at least one of the various embodiments, applications, such as, content classification server application 322, feature extractor 324, web server application 326, other applications 328, or the like, may be arranged to employ geo-location information to select one or more localization features, such as, time zones, languages, currencies, calendar formatting, or the like. Localization features may be used in user-interfaces and well as internal processes and/or databases. In at least one of the various embodiments, geo-location information used for selecting localization information may be provided by GPS 362. Also, in some embodiments, geolocation information may include information providing using one or more geolocation protocols over the networks, such as, wireless network 108 and/or network 111.

Furthermore, in at least one of the various embodiments, content classification server application 322 may be operative in a cloud-based computing environment. In at least one of the various embodiments, these applications, and others, that comprise the management platform may be executing within virtual machines and/or virtual servers that may be managed in a cloud-based based computing environment. Also, in at least one of the various embodiments, content classification server application 322, or the like, may located in virtual servers running in a cloud-based computing environment rather than being tied to one or more specific physical network computers.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
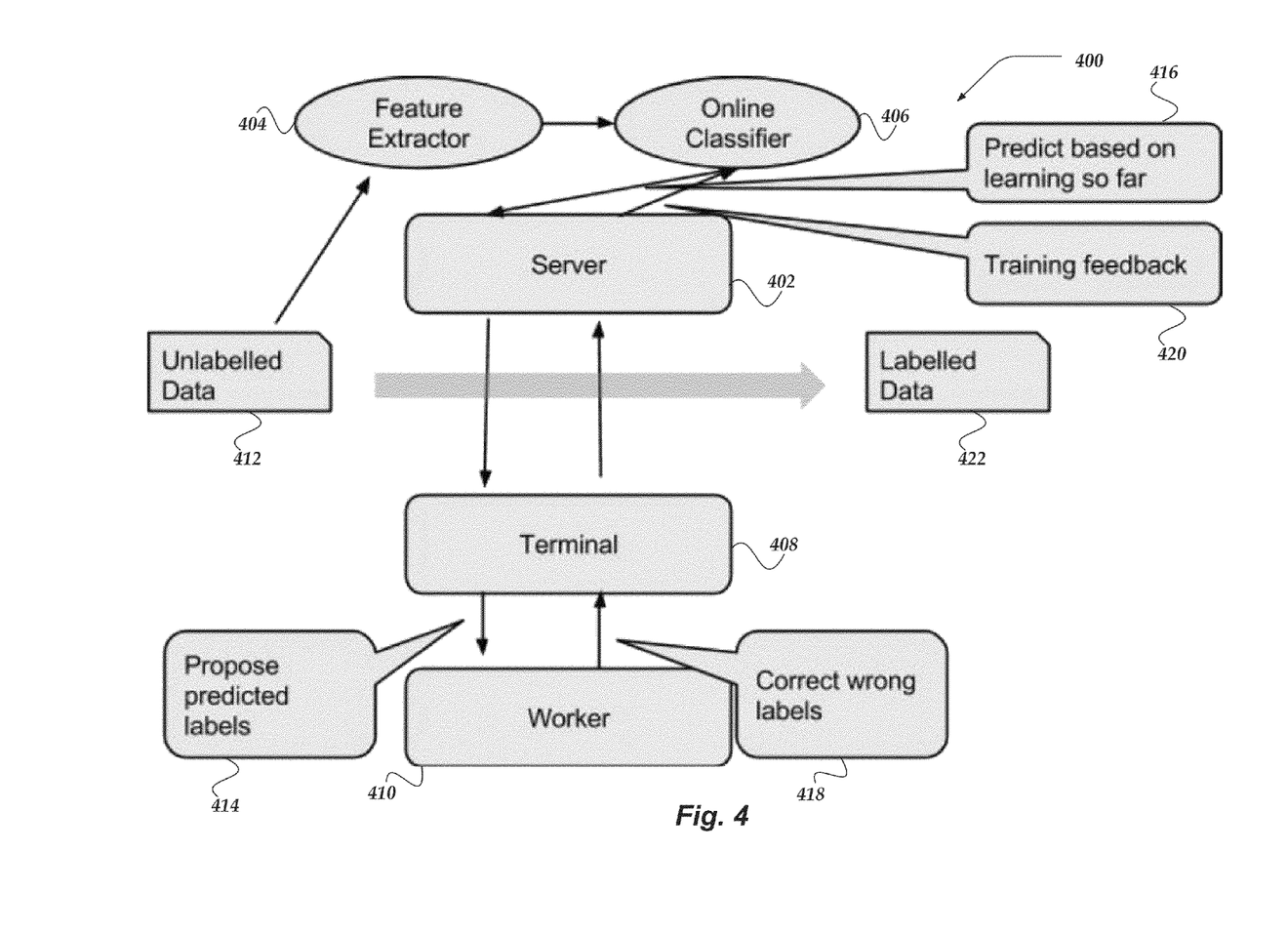
FIG. 4 illustrates a portion of a logical architecture of a system for online content classification in accordance with at least one of the various embodiments.

FIG. 4 illustrates a portion of a logical architecture of system 400 for online content classification in accordance with at least one of the various embodiments. In at least one of the various embodiments, a content classifier server computer, such as, content classifier server computer 117, may be arranged to provide an online classification system, such as, system 400.

In at least one of the various embodiments, system 400 may comprise, server 402, feature extractor 404, online classifier 406, or the like. Also, in at least one of the various embodiments, system 400 may include, terminal 408, worker 410, or the like. In some embodiments, server 402, feature extractor 404, online classifier 406, or the like, may be separate from terminal 408. In at least one of the various embodiments, online classifier 406 may be arranged to be a machine deep learning system.

In at least one of the various embodiments, feature extractor 404 may be an application, such as, feature extractor 324. In at least one of the various embodiments, feature extract 404 may be arranged to process data (either test data or actual data) to prepare it be classified. In some embodiments, feature extractor 404 may determine one or more features of the data that correspond to the characteristics of the provided data.

In at least one of the various embodiments, feature extractor 404 may be arranged to identify features that may be employed by a machine learning system, such as, online classifier 406, to classify data. For example, if the provided data (e.g., data 412) is image data, feature extractor 404 may generate a feature vector using one or more computer based feature extraction techniques, such as, convolution neural networks, principal component analysis, or the like, or combination thereof.

In at least one of the various embodiments, online classifier 406 may be arranged to employ the extracted features to attempt to classify data based on the features identified by the feature extractor. In at least one of the various embodiments, online classifier 404 may be a component of content classifier server application 322.

In at least one of the various embodiments, feature extractor 404 and online classifier 406 may be arranged and/or configured to different types of data, such as, image data, audio data, text, handwriting, speech, or the like, or combination thereof.

In at least one of the various embodiments, unlabeled training data, such as, unlabeled data 412 may be loaded into system 400 and provided to feature extractor 404. In at least one of the various embodiments, training data may be selected from one or more established training data sets, or data may be, selected and/or collected from other sources.

In at least one of the various embodiments, system 400 may be arranged to enable one or more classifiers to be generated based on an interactive process with a worker/user 410, feature extractor 404, and online classifier 406. In at least one of the various embodiments, server 402 may randomly select a batch of unlabeled data and provide the batch to terminal 408. In at least one of the various embodiments, the data may be presented on terminal 408 according to its data type. For examples, images may be displayed on a screen, audio data may be played (or made available to play) over speakers, or the like, or combination thereof In at least one of the various embodiments, a user, such as, worker 410 may be enabled to label the provided data. As described in block 414, worker 410 may propose labels for the displayed data. For example, if the purpose of system 400 is to identify (classify) image data that includes representations of an animal, such as, an alpaca, worker 410 may label the one or more images that are alpacas (if any).

In at least one of the various embodiments, the labeled data may be provided to server 402. The labeled images may be used as training feedback (e.g., block 420) for feature extractor 404.

Next, server 400 may randomly select a batch of unlabeled data and attempt to classify it based on the current state of the classifiers. In at least one of the various embodiments, on the first few tries the classifier may be inaccurate and may make several mistakes. The classified data may be provided to terminal 408.

The worker 410 may use terminal 408 to review the attempted labeling and make corrections (confirming which labels are correct). Accordingly, worker 410 may be enabled to label the data that may have been classified incorrectly. As per block 418, the data may be correctly labeled by worker 410 and then these results may be provided as training feedback 420 to feature extractor 404.

Upon receiving the correct batch of data from the worker, feature extractor 404 and online classifier 406 may be further trained using the corrected batch of data. In at least one of the various embodiments, this process may continue, with subsequent batches of unlabeled test data being selected and labeled using feature extractor 404 and online classifier 406. Accordingly, in at least one of the various embodiments, as the training continues the classifiers should be become more accurate at classifying and labeling data.

For each iteration, in at least one of the various embodiments, the results of each attempted classification may be provided to terminal 408 for scoring by worker 410. In at least one of the various embodiments, this process may continue until test data labeling reaches a defined threshold of accuracy and correctness indicating that feature extractor 404 and online classifier 406 may be sufficient trained.

In at least one of the various embodiments, some or all of the actions attributed to worker 410 may be performed by a machine learning system and/or machine vision system that may be separate and distinct from online classifier 410.

Generalized Operations

Figure 5:
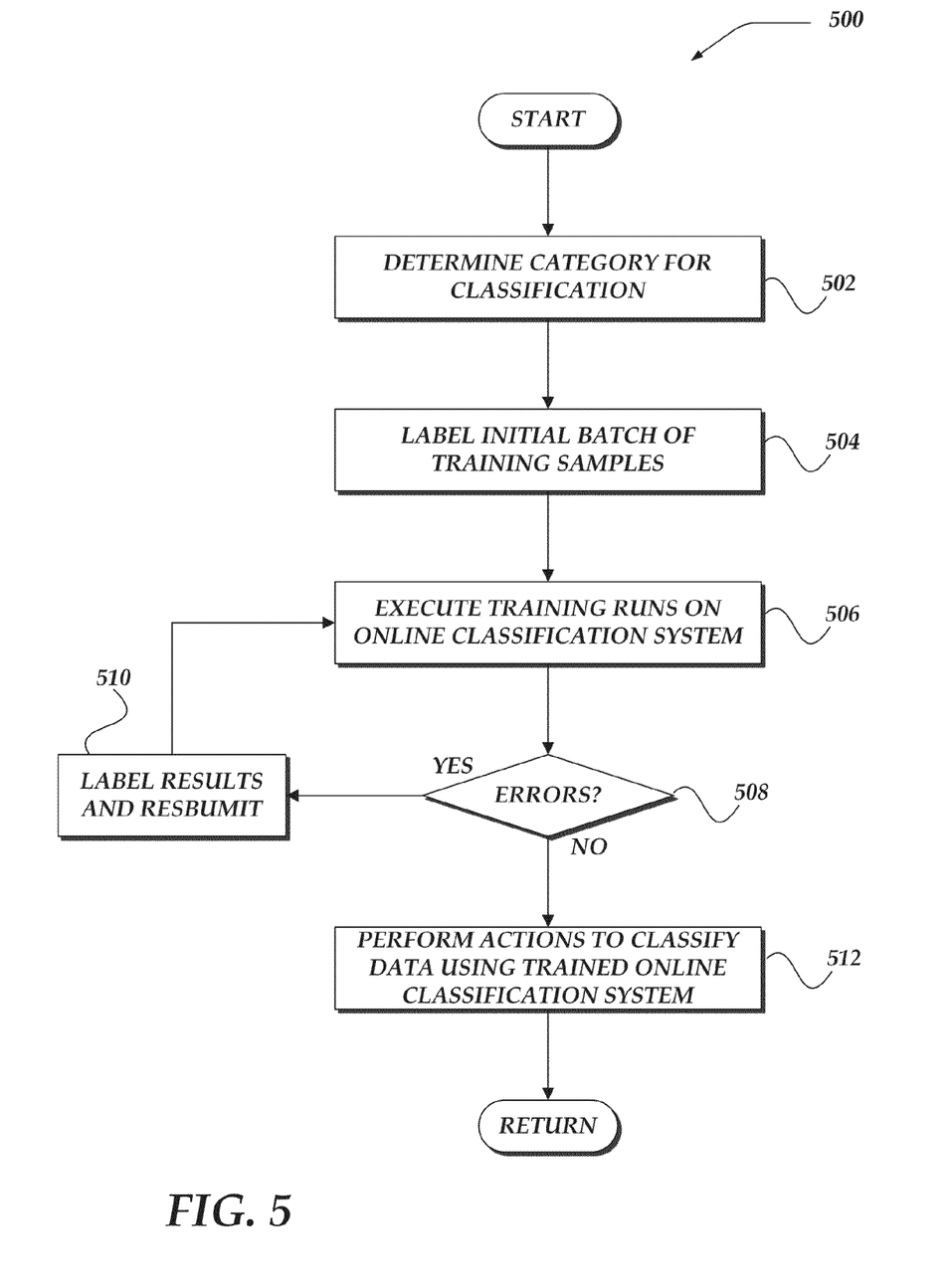
FIG. 5 illustrates a flowchart for a process for online content classification in accordance with at least one of the various embodiments.
Figure 6:
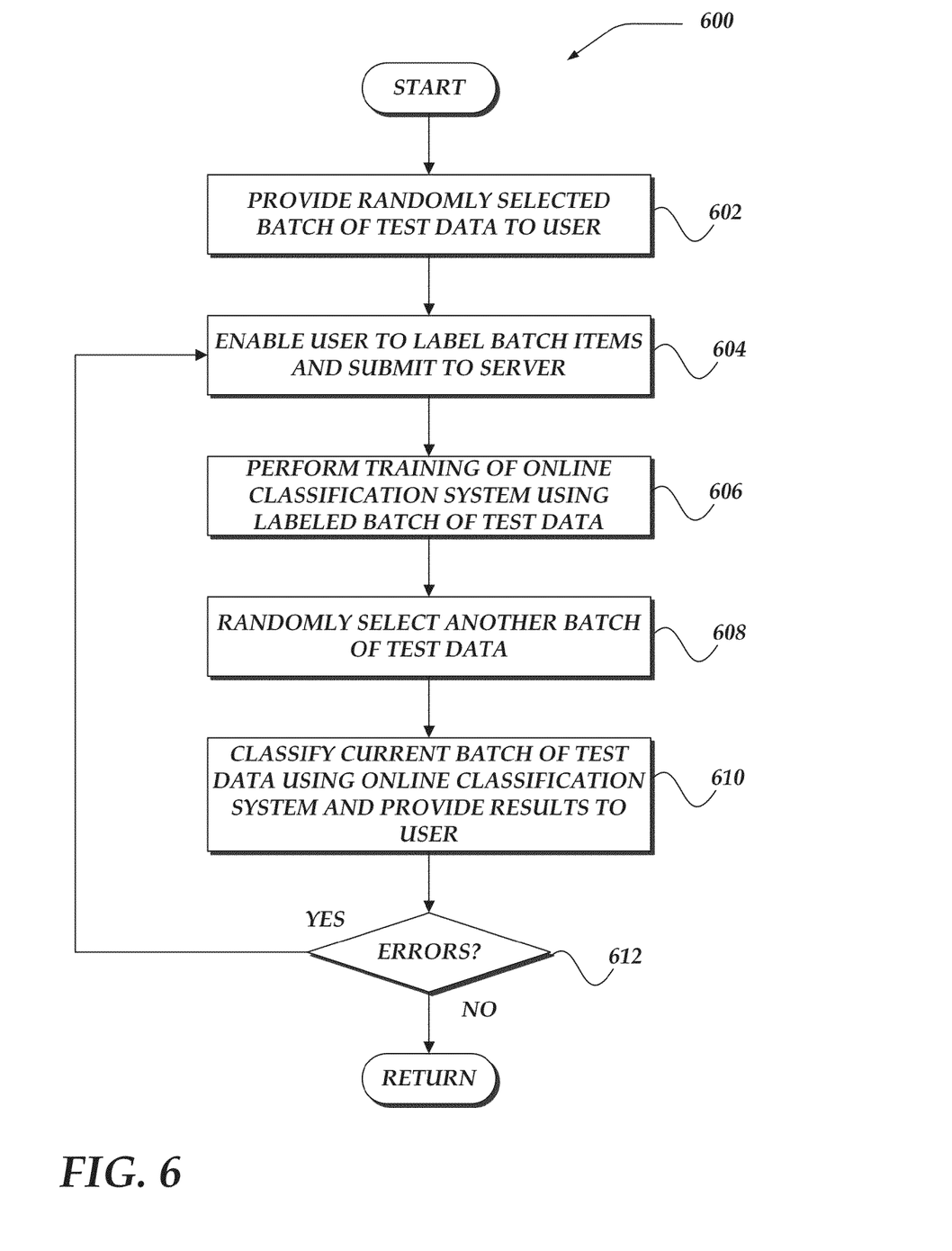
FIG. 6 illustrates a flowchart for a process for interactive training of an online content classifier in accordance with at least one of the various embodiments.

FIGS. 5-6 represent online content classification in accordance with at least one of the various embodiments. In at least one of the various embodiments, processes 500, and 600 described in conjunction with FIGS. 5-6 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 5-6 may be operative in online content classification such as those described in conjunction with FIG. 4.

FIG. 5 illustrates a flowchart for process 500 for online content classification in accordance with at least one of the various embodiments. After at start block, at block 502, in at least one of the various embodiments, one or more categories for classification of data provided to the online classifier system may be determined. For example, in some embodiments, the online classifier system may be arranged to identify whether images include a particular subject matter from, such as, does the image include a picture of an alpaca. In some embodiments, other types of classifications, may include, persons speaking certain words, identifying a particular person from speech samples, identifying particular songs or melodies that may be embedded in audio data, identifying images that contain cancer cells, or the like, or combination thereof At block 504, in at least one of the various embodiments, an initial batch of training samples may be labeled. In some embodiments, the samples may be labeled automatically using another machine learning system. Or, in some embodiments, a user or worker may be enabled to label the initial batch of test data. In at least one of the various embodiments, a user may review the initial batch a data using a terminal and/or client computer that may be remote from content classifier server computer 107.

In at least one of the various embodiments, since the online content classification system uses machine learning and/or machine deep learning system it may be trained using an initial set of sample data that may be provided from a known source, such as, as a standard image data library used for training and evaluating image data. In other embodiments, the data may be collected by the operated of the online content classification system and used as test data.

In at least one of the various embodiments, the batch size of the initial data may be relatively small compared to the size of the overall corpus of test data. For example, in some embodiments, the test data corpus may include millions of items, and the batch may include 10-20 items.

At block 506, in at least one of the various embodiments, the one or more training runs may be executed by the online classification system. In at least one of the various embodiments, labeled batches of test data be provided to the online classification system. Accordingly, in at least one of the various embodiments, the online classification system may perform machine learning, such as, machine deep learning, to train one or more classifiers using the labeled data batch.

In at least one of the various embodiments, the online classification system may train with the labeled data batch and then select another unlabeled batch and attempt to classify those items using the updated classifiers.

At decision block 508, in at least one of the various embodiments, if the results of the classifying the current unlabeled data batch is below a defined threshold, control may flow to block 510; otherwise, control may flow to block 512.

In at least one of the various embodiments, the threshold value may vary depending on the type of data being classified and/or the application. Not all types of data or type of applications (e.g., the purpose behind the classification) require the same level of accuracy. Accordingly, in at least one of the various embodiments, configuration information and/or user input may be used for determining the threshold value for determining success.

At block 510, in at least one of the various embodiments, since the accuracy threshold is not reached, the current batch may be labeled by a user and submitted back to the online classification system to be used to further train the system to improve its classification results. In at least one of the various embodiments, a user may be enabled to employ a user interface to mark/label which data items have been correctly classified. In at least one of the various embodiments, since the number of items in the batch may be less than 20 items, the user, with the aid of an appropriate user interface may quickly mark/label the correct classifications and submit them to the online classification system.

In at least one of the various embodiments, each iteration the machine learning system is provided a small batch of labeled data items, it may be re-trained using the labeled data items. Each iteration the machine learning system is incrementally trained, such that each iteration builds on the performance of the previous iteration.

At block 512, in at least one of the various embodiments, the trained online classification system may be employed for unsupervised classifying of live (non-training) data that may be provided. In at least one of the various embodiments, from time-to-time a user may audit the performance of the unsupervised classification attempts and either make corrections and described for block 510, or suspend unsupervised classification until the online classification system is re-trained. Next, control may be returned to a calling process.

FIG. 6 illustrates a flowchart for process 600 for interactive training of an online content classifier in accordance with at least one of the various embodiments. After at start block, at block 602, in at least one of the various embodiments, a randomly selected batch of test data may be provided to a user. In at least one of the various embodiments, a server, such as, network computer 300 may communicate the test batch to a terminal that may be a client computer, such as, client computer 200.

At block 604, in at least one of the various embodiments, a user may be enabled to label the batch items and provide them back to the server. In at least one of the various embodiments, the initial batch of items may be unlabeled if the online classification system is untrained. Accordingly, the user may label the data items according to category/classification that may be of interest. For example, if the online classification system is arranged to determine if an image includes one or more alpacas, the user may label the batch items to indicate if they includes an image of an alpaca. In at least one of the various embodiments, a client computer, such as, client computer 200, may be arranged to display (or play) the data items so the user may label the items if they match the category of interest.

At block 606, in at least one of the various embodiments, as described above, the online classification system may be trained using the current labeled batch of test data. At block 608, in at least one of the various embodiments, the online classification system may randomly select another batch of test data items from among the remaining unlabeled test data items. At block 610, in at least one of the various embodiments, the online classification system may attempt to classify the current batch of test data items and provide to the results to the user.

At decision block 612, in at least one of the various embodiments, if the results of the classifying the current unlabeled data batch is below a defined threshold, control may loop back to block 604; otherwise, control may be returned to a calling process.

In at least one of the various embodiments, the threshold value may vary depending on the type of data being classified and/or the application. Not all types of data or type of applications (e.g., the purpose behind the classification) require the same level of accuracy. Accordingly, in at least one of the various embodiments, configuration information and/or user input may be used for determining the threshold value for determining success.

In at least one of the various embodiments, since the initial batch may be small relative to the size of the test data (e.g., 20 samples or less), it is likely that the first training attempts will be insufficient completely train the online classification system in the first training attempt. However, each iteration will improve the learning results.

It will be understood that each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Use Cases

Figure 7:
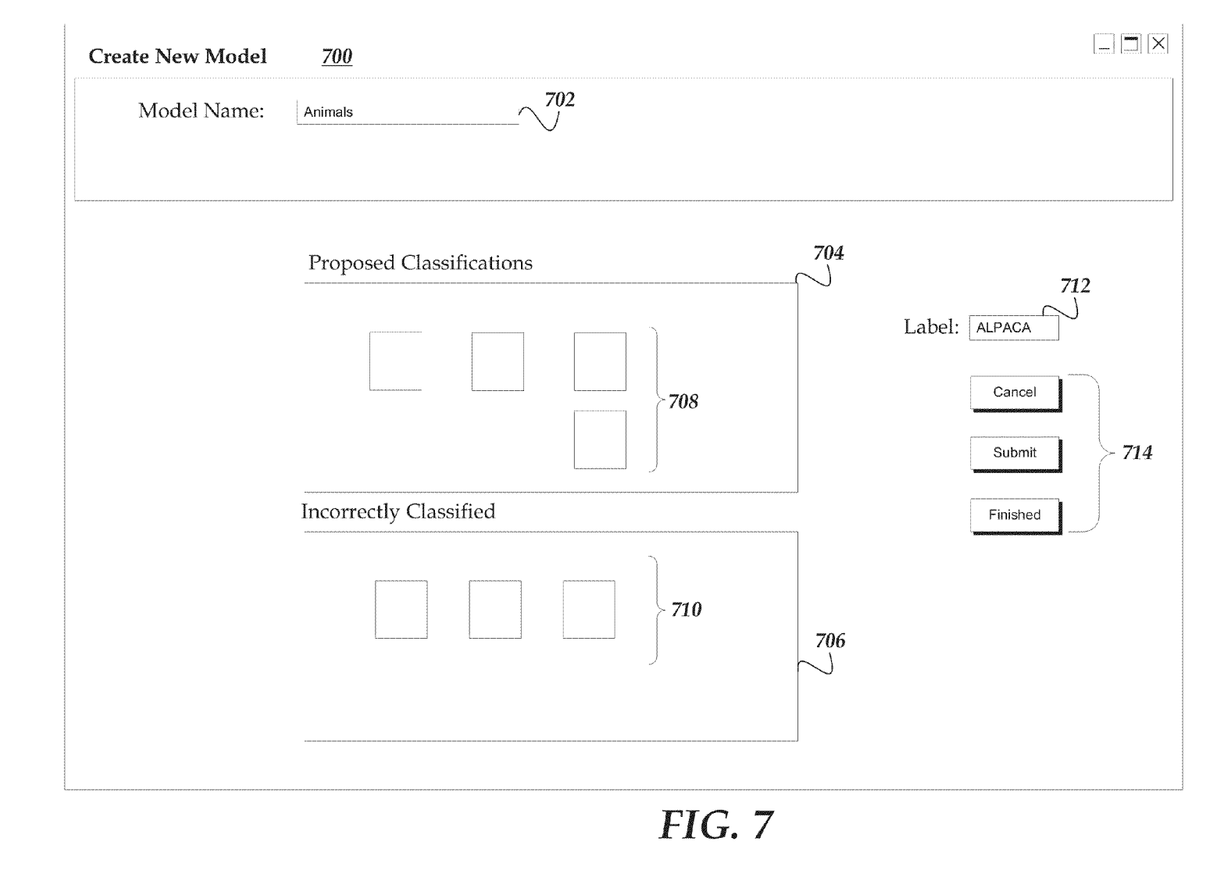
FIG. 7 illustrates a user interface for interactive training of test data batches for online content classification in accordance with at least one of the various embodiments.

FIG. 7 illustrates a non-limiting example of a user interfaces for online content classification in accordance with at least one of the various embodiments. One of ordinary skill in the art will appreciate that other user interfaces may be used without departing for the scope of the innovations described herein. Further, the below described user interfaces are sufficient of ordinary skill in the art to understand and practice the innovations described herein.

FIG. 7 illustrates user interface 700 for interactive training of test data batches for online content classification in accordance with at least one of the various embodiments. In this example, user interface 700 is arranged to enable a user to quickly identify test data that has been correctly labeled by a component of an online content classification system, such as, content classifier server application 322. In at least one of the various embodiments, user interface 700 may include a form or field representing the name of the model that is being created/trained. In this example, label 702 contains the value "Animals" indicating the user may be generating a model classifying animals.

Accordingly, in at least one of the various embodiments, there may be two workspaces, workspace 704 and workspace 706 used by a user to indicate the data items in a batch that have been classified carefully or not. In this example, the online classification system may propose classifications for a set of batch data item and display them it in workspace 706. If the type of data is image data, thumbnail images of the items may be displayed in the workspace. Likewise, in at least one of the various embodiments, if the data is text documents, thumbnails of the documents may be rendered and displayed in the workspaces.

Accordingly, in at least one of the various embodiments, user interface 700 may initially display the entire test batch in workspace 704. Some of the items in workspace 704 may be labeled incorrectly, accordingly, the user may move those items into workspace 706. If the user has finished grading/marking the test batch classification results, workspace 704 may contain correctly classified items and workspace 706 may contain incorrectly classified items. In this example, items 708 in workspace 704 may represent test batch items that were correctly classified by the online classification system (as determined by the user) and items 710 in workspace 706 may represent test batch items that were incorrectly classified by the online classification system.

In at least one of the various embodiments, user interface 700 may be arranged to enable a user to drag-and-drop the thumbnails in the workspaces. Accordingly, the user may drag-and-drop the test batch data items from one workspace to another to indicate if they have been correctly categorized.

In at least one of the various embodiments, during the training user interface may enable a user to select one or more labels used to train for. In this example, field 712 indicates that the user is training the model to recognize Alpacas. Further, user interface 700 may include one or more user-interface elements, such as, buttons 714 that enable the user to perform testing.

What is claimed as new and desired to be protected by Letters Patent of the United States is:

1. A method of training a machine deep learning system, using a network computer, comprising:
when a classification result score is less than a threshold value, iteratively performing further actions, including:
randomly selecting a batch of data items from unlabeled test data;
providing a classification of the batch of data items using the machine deep learning system, wherein the machine deep learning system is partially trained by one or more previously labeled data items;
communicating the batch of classified data items to a client computer;
labeling one or more classified data items based on content of the one or more classified data items;
communicating the one or more labeled data items to the machine deep learning system;
employing the one or more labeled data items to further train the machine deep learning system; and
updating the classification result score based on a count of the one or more labeled data items that are classified correctly by the machine deep learning system; and
when the classification result score at least meets the threshold value, employing the machine deep learning system to classify live data.

2. The method of claim 1, further comprising,
randomly selecting a first batch of data items from the unlabeled test data;
communicating the first batch of data items to a client computer;
enabling the user of the client computer to label each data item in the first batch of data items based on content of each data item; and
employing the labeled first batch of data items to initially train the machine deep learning system.

3. The method of claim 1, wherein the test data and the live data, further comprises, one or more of, images, documents, text documents, audio, financial data, or human speech.

4. The method of claim 1, wherein the threshold value for the classification result score is defined based on an application of the machine deep learning system, or a data type of the test data.

5. The method of claim 1, wherein classifying the batch of data items, further comprises:
extracting one or more features of the data items in the batch; and
classifying each of the data items based on the one or more extracted features.

6. The method of claim 1, wherein the one or more classified data items are labeled by one or more other machine learning systems or a user.

7. The method of claim 1, further comprising, providing a user interface that includes at least two workspaces, wherein one workspace displays the test data items that are classified correctly and the other workspace displays the test data items that are classified incorrectly.

8. The method of claim 1, wherein labeling the one or more classified data items, further comprises:
grouping correctly classified data items into a first group; and
grouping incorrectly classified data items into a second group.

9. A system for training a machine deep learning system, comprising:
a network computer, comprising:
a transceiver that communicates over the network;
a memory that stores at least instructions; and
a processor device that executes instructions that perform actions, including:
when a classification result score is less than a threshold value, iteratively performing further actions, including:
randomly selecting a batch of data items from unlabeled test data;
providing a classification of the batch of data items using the machine deep learning system, wherein the machine deep learning system is partially trained by one or more previously labeled data items;
communicating the batch of classified data items to a client computer;
employing one or more labeled data items to further train the machine deep learning system; and
updating the classification result score based on a count of the one or more labeled data items that are classified correctly by the machine deep learning system; and
when the classification result score at least meets the threshold value, employing the machine deep learning system to classify live data; and
the client computer, comprising:
a transceiver that communicates over the network;
a memory that stores at least instructions; and
a processor device that executes instructions that perform actions, including:
labeling one or more classified data items based on content of the one or more classified data items; and
communicating the one or more labeled data items to the machine deep learning system.

10. The system of claim 9, wherein the network computer processor device executes instructions that perform actions, further comprising,
randomly selecting a first batch of data items from the unlabeled test data;
communicating the first batch of data items to a client computer;
enabling the user of the client computer to label each data item in the first batch of data items based on content of each data item; and
employing the labeled first batch of data items to initially train the machine deep learning system.

11. The system of claim 9, wherein the test data and the live data, further comprises, one or more of, images, documents, text documents, audio, financial data, or human speech.

12. The system of claim 9, wherein the threshold value for the classification result score is defined based on an application of the machine deep learning system, or a data type of the test data.

13. The system of claim 9, wherein classifying the batch of data items, further comprises:
    extracting one or more features of the data items in the batch; and
    classifying each of the data items based on the one or more extracted features.

14. The system of claim 9, wherein the one or more classified data items are labeled by one or more other machine learning systems or a user.

15. The system of claim 9, wherein the client computer processor device executes instructions that perform actions, further compromising, providing a user interface that includes at least two workspaces, wherein one workspace displays the test data items that are classified correctly and the other workspace displays the test data items that are classified incorrectly.

16. The system of claim 9, wherein labeling the one or more classified data items, further comprises:
    grouping correctly classified data items into a first group; and
    grouping incorrectly classified data items into a second group.

17. A processor readable non-transitory storage media that includes instructions for training a machine deep learning system, wherein execution of the instructions by a hardware processor performs actions, comprising:
    when a classification result score is less than a threshold value, iteratively performing further actions, including:
        randomly selecting a batch of data items from unlabeled test data;
        providing a classification of the batch of data items using the machine deep learning system, wherein the machine deep learning system is partially trained by one or more previously labeled data items;
        communicating the batch of classified data items to a client computer;
        labeling one or more classified data items based on content of the one or more classified data items;
        communicating the one or more labeled data items to the machine deep learning system;
        employing the one or more labeled data items to further train the machine deep learning system; and
        updating the classification result score based on a count of the one or more labeled data items that are classified correctly by the machine deep learning system; and
    when the classification result score at least meets the threshold value, employing the machine deep learning system to classify live data.

18. The media of claim 17, further comprising,
    randomly selecting a first batch of data items from the unlabeled test data;
    communicating the first batch of data items to a client computer;
    enabling the user of the client computer to label each data item in the first batch of data items based on content of each data item; and
    employing the labeled first batch of data items to initially train the machine deep learning system.

19. The media of claim 17, wherein the test data and the live data, further comprises, one or more of, images, documents, text documents, audio, financial data, or human speech.

20. The media of claim 17, wherein the threshold value for the classification result score is defined based on an application of the machine deep learning system, or a data type of the test data.

21. The media of claim 17, wherein classifying the batch of data items, further comprises:
    extracting one or more features of the data items in the batch; and
    classifying each of the data items based on the one or more extracted features.

22. The media of claim 17, wherein the one or more classified data items are labeled by one or more other machine learning systems or a user.

23. The media of claim 17, further compromising, providing a user interface that includes at least two workspaces, wherein one workspace displays the test data items that are classified correctly and the other workspace displays the test data items that are classified incorrectly.

24. A network computer for training a machine deep learning system, comprising:
    a transceiver that communicates over the network;
    a memory that stores at least instructions; and
    a processor device that executes instructions that perform actions, including:
        when a classification result score is less than a threshold value, iteratively performing further actions, including:
            randomly selecting a batch of data items from unlabeled test data;
            providing a classification of the batch of data items using the machine deep learning system, wherein the machine deep learning system is partially trained by one or more previously labeled data items;
            communicating the batch of classified data items to a client computer;
            labeling one or more classified data items based on content of the one or more classified data items;
            communicating the one or more labeled data items to the machine deep learning system;
            employing the one or more labeled data items to further train the machine deep learning system; and
            updating the classification result score based on a count of the one or more labeled data items that are classified correctly by the machine deep learning system; and
        when the classification result score at least meets the threshold value, employing the machine deep learning system to classify live data.

25. The network computer of claim 24, wherein the processor device executes instructions that perform actions, further comprising,
    randomly selecting a first batch of data items from the unlabeled test data;
    communicating the first batch of data items to a client computer;
    enabling the user of the client computer to label each data item in the first batch of data items based on content of each data item; and
    employing the labeled first batch of data items to initially train the machine deep learning system.

26. The network computer of claim 24, wherein the test data and the live data, further comprises, one or more of, images, documents, text documents, audio, financial data, or human speech.

27. The network computer of claim 24, wherein the threshold value for the classification result score is defined based on an application of the machine deep learning system, or a data type of the test data.

28. The network computer of claim 24, wherein classifying the batch of data items, further comprises:
- extracting one or more features of the data items in the batch; and
- classifying each of the data items based on the one or more extracted features.

29. The network computer of claim 24, wherein the one or more classified data items are labeled by one or more other machine learning systems or a user.

30. The network computer of claim 24, wherein labeling the one or more classified data items, further comprises:
- grouping correctly classified data items into a first group; and
- grouping incorrectly classified data items into a second group.

* * * * *